(12) United States Patent
Warden et al.

(10) Patent No.: US 12,012,236 B2
(45) Date of Patent: Jun. 18, 2024

(54) COLLET ASSEMBLY OF AN UMBILICAL PLATE THAT COUPLES A LAUNCH VEHICLE TO A GROUND STATION

(71) Applicant: THE BOEING COMPANY, Chicago, IL (US)

(72) Inventors: Harry Kendall Warden, Huntsville, AL (US); Jeffrey Wayne Weathers, Huntsville, AL (US); James Boyd Weathers, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 140 days.

(21) Appl. No.: 17/647,351

(22) Filed: Jan. 7, 2022

(65) Prior Publication Data

US 2022/0267034 A1    Aug. 25, 2022

Related U.S. Application Data

(60) Provisional application No. 63/151,928, filed on Feb. 22, 2021.

(51) Int. Cl.
*B64G 5/00* (2006.01)
(52) U.S. Cl.
CPC ...................................... *B64G 5/00* (2013.01)

(58) Field of Classification Search
CPC ... B64G 5/00; B64G 1/002; F41F 3/04; B64F 1/28
See application file for complete search history.

(56) References Cited

U.S. PATENT DOCUMENTS 3,335,391 A * 8/1967 Prow, Jr. ............... H01R 13/635
439/155
5,122,067 A * 6/1992 Sunne ................ H01R 13/6276
439/258

OTHER PUBLICATIONS

William C. Manley et al., Ares I Linear Mate Umbilical Plate and Collet, May 16-18, 2012, Proceedings of the 41st Aerospace Mechanisms Symposium (Year: 2012).*

* cited by examiner

*Primary Examiner* — Tien Q Dinh
*Assistant Examiner* — Nevena Aleksic
(74) *Attorney, Agent, or Firm* — The Small Patent Law Group LLC; Joseph M. Butscher (57) ABSTRACT

A collet assembly, for an umbilical plate that connects a vehicle to a ground station prior to a launch of the vehicle, includes an active decoupler. The active decoupler includes a pin. A cuff has a central opening. The pin passes through the central opening. A plurality of fingers are pivotally coupled to the cuff. A plurality of levers are pivotally coupled to the plurality of fingers and the pin.

20 Claims, 7 Drawing Sheets

COLLET ASSEMBLY OF AN UMBILICAL PLATE THAT COUPLES A LAUNCH VEHICLE TO A GROUND STATION

CROSS-REFERENCE TO RELATED APPLICATIONS

This application relates to and claims priority benefits from U.S. Provisional Patent Application No. 63/151,928, filed Feb. 22, 2021, which is hereby incorporated by reference in its entirety.

STATEMENT REGARDING FEDERALLY SPONSORED RESEARCH OR DEVELOPMENT

The invention described herein was made in the performance of work under NASA Contract No. NNM07AB03C and is subject to the provisions of Section 305 of the National Aeronautics and Space Act of 1958 (72 Stat. 435: 42 U.S.C. 2457).

FIELD OF THE DISCLOSURE

Examples of the subject disclosure generally relate to a collet assembly of an umbilical plate that couples a launch vehicle to a ground station before the launch vehicle is launched.

BACKGROUND OF THE DISCLOSURE

Prior to being launched, certain launch vehicles, such as aeronautical and space vehicles, are coupled to a ground station through an umbilical plate. The umbilical plate couples the launch vehicle to the ground station. In general, the umbilical plate includes various interfaces for coupling the launch vehicle to the ground station prior to the launch vehicle being launched. For example, the umbilical plate includes mechanical couplings, electrical lines, fluid lines, and/or the like.

The umbilical plate typically includes a flight portion and a ground portion. As the vehicle is launched, the flight portion separates from the ground portion. Upon launching, the flight portion remains with the vehicle, while the ground portion remains with the ground station.

As the launch vehicle is launched at time (t)=0, the flight portion separates from the ground portion. To achieve such separation, the umbilical plate typically includes a collet mechanism. As the vehicle is launched, the collet mechanism operates to separate the flight portion form the ground portion. Typically, the collet mechanism includes a pin that spreads fingers to securely couple the flight portion to the ground portion. In an engaged position in which the flight portion is secured to the ground portion, the pin is disposed between the fingers, thereby spreading the fingers apart. The spread fingers include portions that are secured within the cup of the flight portion. In the engaged position, the fingers are spread apart a distance that prevents the fingers from retreating out of an opening of the cup. During a launch, the pin is retracted from a position between the fingers, thereby allowing the fingers to collapse inwardly, and retreat from the cup. In this manner, the flight portion is able to separate from the ground portion.

However, it has been found that friction between the fingers and other portions of the collet mechanism may cause the fingers to remain outwardly spread, even when the pin is retracted during a launch sequence. As such, the flight portion may not always easily separate from the ground portion.

In short, the known collet mechanism is a passive design. Passive collet separation can result in off-nominal conditions that can hinder a desired separation of the flight portion from the ground portion.

SUMMARY OF THE DISCLOSURE

A need exists for a system and a method for ensuring separation of a flight portion from a ground portion as a vehicle is launched. Further, a need exists for an improved collet mechanism that ensures proper separation during launch.

With those needs in mind, certain examples of the subject disclosure provide a collet assembly for an umbilical plate that connects a vehicle to a ground station prior to a launch of the vehicle. The collet assembly including an active decoupler including a pin, and a cuff having a central opening. The pin passes through the central opening. A plurality of fingers are pivotally coupled to the cuff. A plurality of levers pivotally are coupled to the plurality of fingers and the pin.

In at least one example, each of the plurality of levers is pivotally coupled to a respective one of the plurality of fingers.

In at least one example, the collet assembly also includes a flight portion coupled to a ground portion. The flight portion is configured to separate from the ground portion as the vehicle is launched. As an example, the active decoupler is disposed within an extension arm of the ground portion.

In at least one example, the cuff is fixed within the ground portion.

In at least one example, the active decoupler is configured to move between an engaged position in which the plurality of levers outwardly brace the plurality of fingers, and a retracted position in which the plurality of levers inwardly pull the plurality of fingers. As a further example, the plurality of levers in the engaged position are substantially perpendicular to a longitudinal axis of the collet assembly.

In at least one example, the collet assembly also includes a spring coupled to the pin, a linkage coupled to the pin, and a roller operatively coupled to the linkage. The roller is configured to be moved between a first position in which the linkage is linearly aligned and a second position in which the linkage is angularly aligned.

Certain examples of the subject disclosure provide a method for connecting a vehicle to a ground station prior to a launch of the vehicle. The method includes providing a collet assembly having an active decoupler. Said providing includes passing a portion of a pin through a central opening of a cuff, pivotally coupling a plurality of fingers to the cuff, and pivotally coupling a plurality of levers to the plurality of fingers and the pin.

Certain example of the subject disclosure provide a system including a vehicle, a ground station, and an umbilical plate connecting the vehicle to the ground station prior to a launch of the vehicle. The umbilical plate includes a collet assembly having an active decoupler, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain examples of the subject disclosure provide a collet assembly for an umbilical plate that is configured to couple a launch vehicle to a ground station. Unlike known collet mechanisms that rely on a preload of fingers to facilitate separation during launch, the collet assembly according to examples of the subject disclosure employs active separation through the introduction of one or more mechanical links that provide radial inward motion, such as of multiple levers upon retraction of a center pin. The active separation mechanism improves performance of the collet assembly, as it is less sensitive to variables (for example, friction) that can prove difficult to control.

Certain examples of the subject disclosure provide a collet assembly that is configured for active separation. The collet assembly includes a plurality of fingers that are coupled to a spring and pin. One or more mechanical links couple the fingers to the pin. The mechanical links provide over-center mechanisms that create the load required to collapse the fingers.

Figure 1:
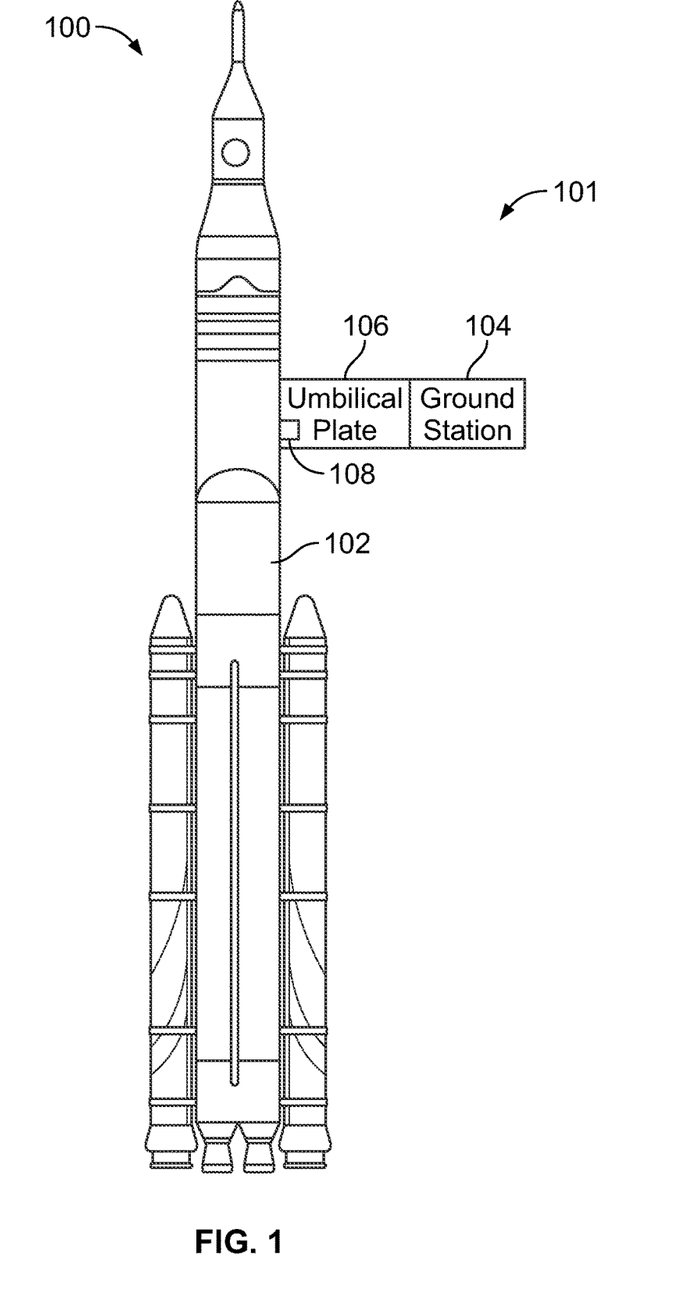
FIG. 1 illustrates a front view of a vehicle, according to an example of the subject disclosure.

FIG. 1 illustrates a front view of a vehicle 100, according to an example of the subject disclosure. The vehicle 100 is a launch vehicle. For example, the launch vehicle is a space vehicle, such as a rocket. The vehicle 100 can include an integrally stiffened barrel, which may surround a portion of a vehicle stage. Optionally, embodiments of the present disclosure may be used with various other types of vehicles, such as airplanes, land-based vehicles, watercraft, and/or the like.

The vehicle 100 can include various stages, such as a vehicle stage 102. Prior to launch, the vehicle 100 connects to a ground station 104 through an umbilical plate 106. The umbilical plate 106 includes a collet assembly 108. As the vehicle 100 is launched, the collet assembly 108 operates to separate a flight portion from a ground portion. As the vehicle 100 is launched, the flight portion remains with the vehicle 100, while the ground portion remains with the umbilical plate 106 that remains connected to the ground station 104.

As shown, a system 101 includes the vehicle 100 coupled to the ground station 104 through the umbilical plate 106, which includes the collet assembly 108. While a single umbilical plate 106 is shown, it is to be understood that the vehicle 100 can be coupled to one or more ground stations 104 through additional umbilical plates 106. For example, numerous stages of the vehicle 100 can connect to one or more ground stations 104 through a plurality of umbilical plates 106.

Figure 2:
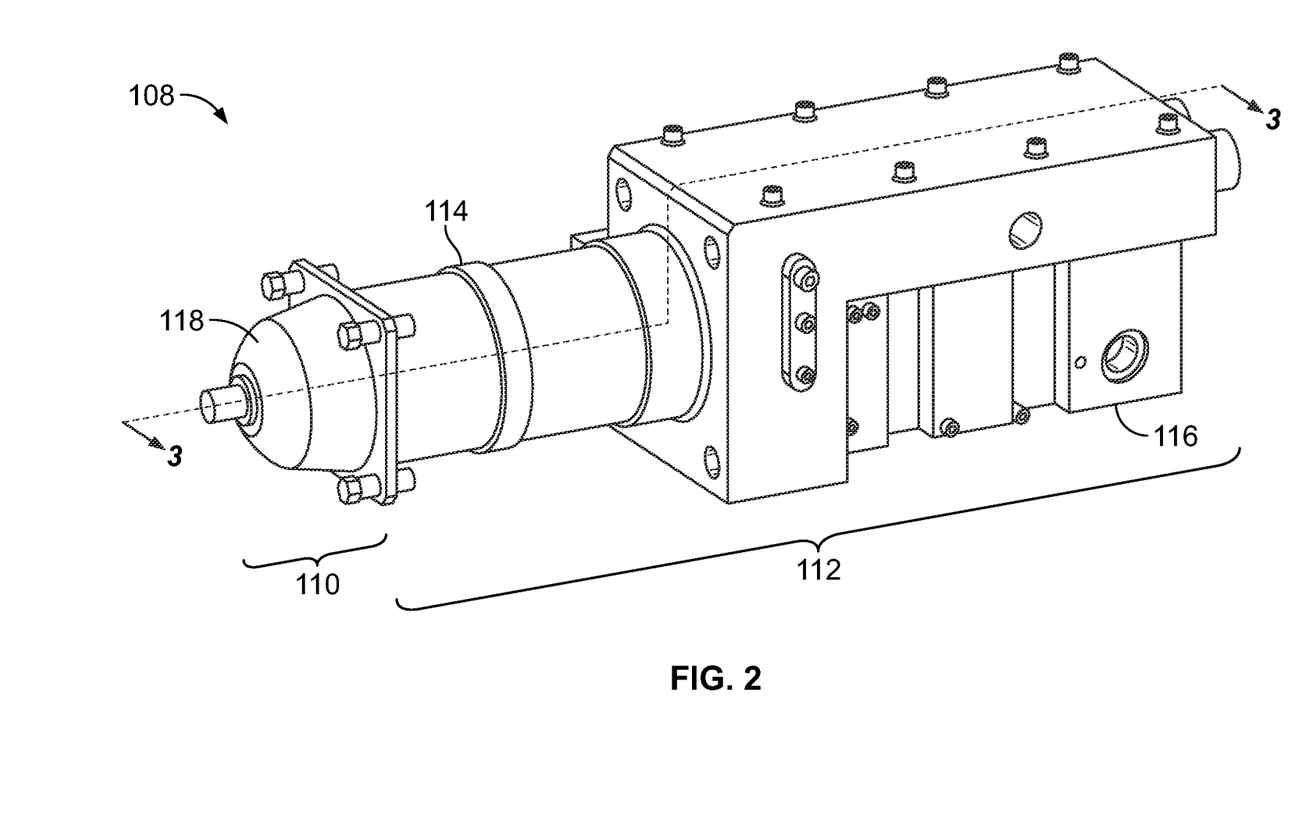
FIG. 2 illustrates a perspective view of a collet assembly, according to an example of the subject disclosure.

FIG. 2 illustrates a perspective view of the collet assembly 108, according to an example of the subject disclosure. The collet assembly 108 includes a flight portion 110 and a ground portion 112. Referring to FIGS. 1 and 2, the ground portion 112 includes an extension arm 114 that outwardly extends from a ground housing 116 of the ground portion 112. The flight portion 110 includes a nose 118 that directly connects to a portion of the vehicle 100 prior to launch. During a launch, the nose 118 separates from the extension arm 114, and remains with the vehicle 100.

Figure 3:
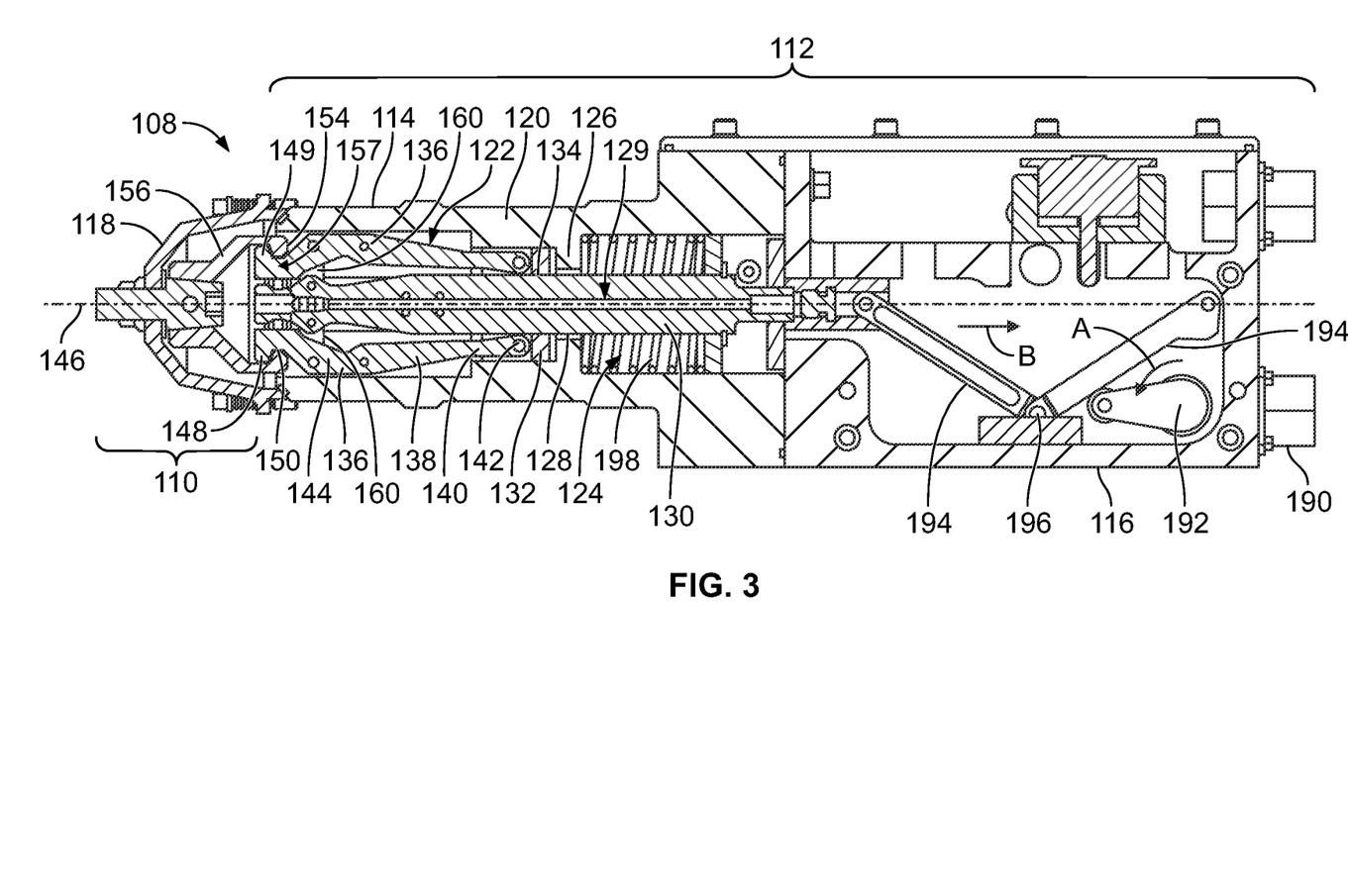
FIG. 3 illustrates a transverse cross-sectional view of the collet assembly of FIG. 2 through line 3-3.

FIG. 3 illustrates a transverse cross-sectional view of the collet assembly 108 of FIG. 2 through line 3-3. The flight portion 110 includes a main body 120 having a first internal chamber 122 separated from a second internal chamber 124 by a wall 126. The wall 126 includes a central passage 128.

An active decoupler 129 is disposed within the collet assembly 108. A pin 130 extends through the central passage 128. The pin 130 extends into the first internal chamber 122 and the second internal chamber 124. A cuff 132 is fixed within the first internal chamber 122. For example, the cuff 132 is securely fixed to portions of the main body 120, such as to the wall 126 on an opposite side of the second internal chamber 124. The pin 130 passes through a central opening 134 of the cuff 132.

Referring to FIGS. 1-3, as described herein, the umbilical plate 106 includes the collet assembly 108. The umbilical plate 106 connects the vehicle 100 to the ground station 104 prior to a launch of the vehicle 100. The collet assembly 108 includes the active decoupler 129 that includes the pin 130. The cuff 132 has the central opening 134. The pin 130 passes through the central opening 134. The plurality of fingers 136 are pivotally coupled to the cuff 132. A plurality of levers 160 are pivotally coupled to the plurality of fingers 136 and the pin 130. That is, each of the levers 160 pivotally couples a respective finger 136 to the pin 130.

In at least one example, each of the plurality of levers 160 is pivotally coupled to a respective one of the plurality of fingers 136. For example, each lever 160 is associated with a single respective finger 136. As another example, multiple levers 160 can pivotally couple one finger 136 to the pin 130.

As shown in FIG. 3, the active decoupler 129 is disposed within the extension arm 114. As described herein, during a launch, the flight portion 110 separates from the ground portion 112, and the active decoupler 129 remains with the ground portion 112.

Figure 4:
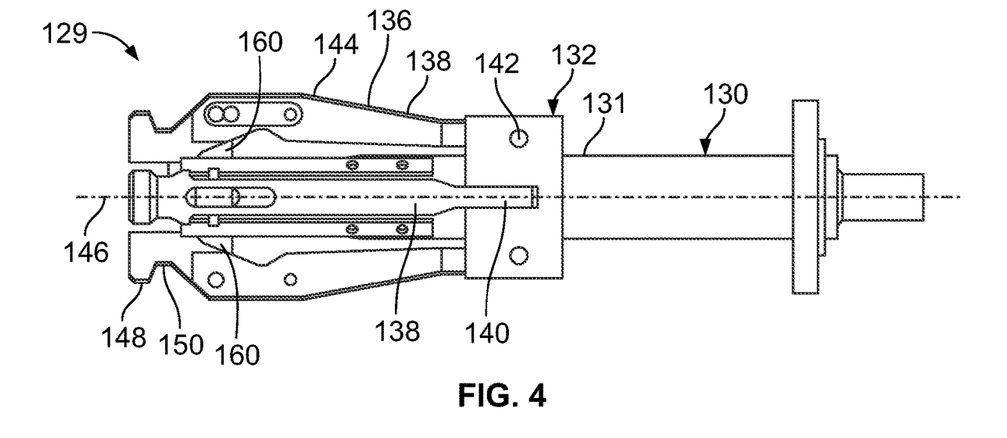
FIG. 4 illustrates a lateral view of an active decoupler, according to an example of the subject disclosure.

FIG. 4 illustrates a lateral view of the active decoupler 129, according to an example of the subject disclosure. The active decoupler 129 includes the pin 130, the cuff 132 disposed around an outer surface of a shaft 131 of the pin 130, the plurality of fingers 136 pivotally coupled to the cuff 132, and a plurality of levers 160 pivotally coupled to the fingers 136 and the pin 130.

Referring to FIGS. 3 and 4, the cuff 132 is fixed in position within the flight portion 110. The fingers 136 are pivotally coupled to the cuff 132. For example, each finger 136 includes an extension beam 138 having a cuff end 140 that is pivotally coupled to the cuff 132, such as through a pinned coupling 142. The extension beam 138 further includes an outwardly-bowed intermediate portion 144. The intermediate portion 144 outwardly bows away from a central longitudinal axis 146 of the collet assembly 108. The intermediate portion 144 connects to a securing end 148 having a notch 150 that securely latches onto a ridge 154 of a cup 156 of the nose 118 of the flight portion 110.

The levers 160 pivotally couple the fingers 136 to the pin 130. The levers 160 are pivotally coupled to the fingers 136 proximate to the securing ends 148. The levers 160 can be distally located from the cuff 132.

Figure 5:
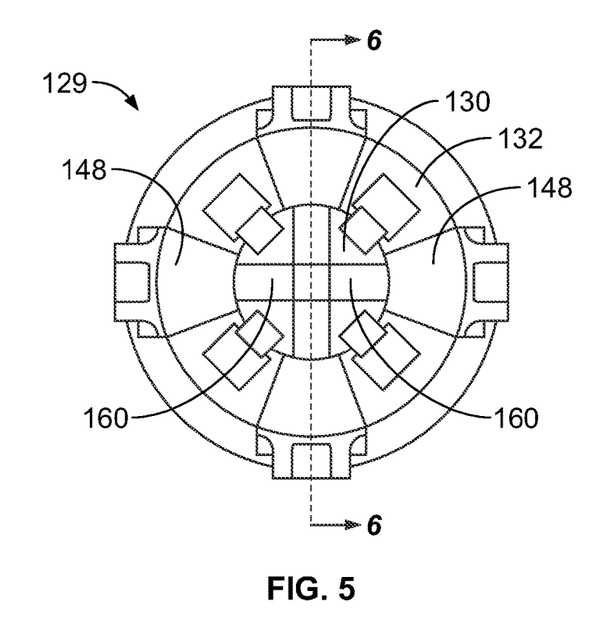
FIG. 5 illustrates an end view of the active decoupler.

FIG. 5 illustrates an end view of the active decoupler 129. FIG. 5 shows the securing ends 148 of the fingers 136.

Figure 6:
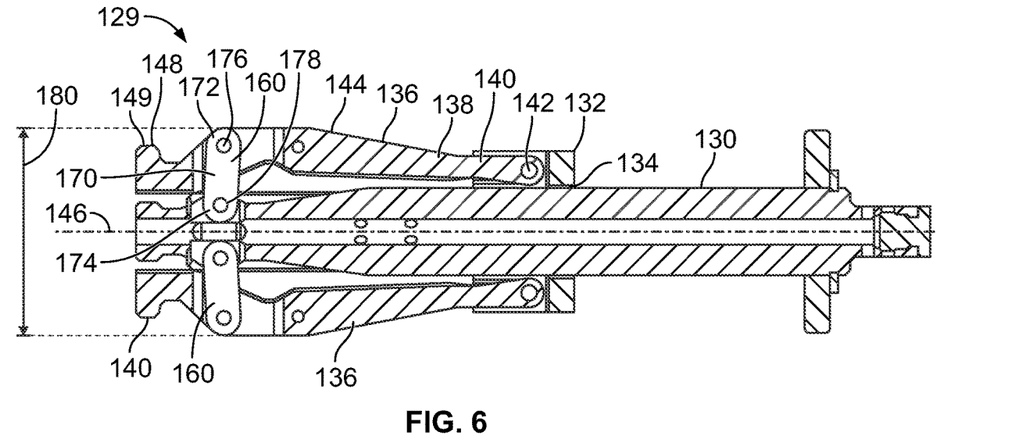
FIG. 6 illustrates a cross-sectional view of the active decoupler in an engaged position through line 6-6 of FIG. 5.

FIG. 6 illustrates a cross-sectional view of the active decoupler 129 in an engaged position through line 6-6 of FIG. 5. As shown, the pin 130 extends through central opening 134 of the cuff 132. Each finger 136 pivotally couples to the pin 130 through a lever 160. As shown, the levers 160 include beams 170 having a finger end 172 and a pin end 174. The finger end 172 pivotally couples to a respective finger 136 through a pinned coupling 176. The pin end 174 pivotally couples to the pin 130 through a pinned coupling 178.

In the engaged position, the pin 130 extends between the intermediate portions 144 of the fingers 136 such that the levers 160 are perpendicular or substantially perpendicular (such as =/−5 degrees) to the central longitudinal axis 146. For example, in the engaged position, the pinned couplings 176 are generally linearly aligned with the pinned couplings 178 so as to be substantially perpendicular to the longitudinal axis 146. As such, in the engaged position, the active coupler 129 is in an expanded position in which an outer envelope 180 of the fingers 136, collectively, is expanded.

Referring to FIGS. 3-6, in the engaged position, in which the fingers 136 having an expanded axial profile, the securing ends 148 of the fingers 136 are latched onto the ridge 154 of the cup 156. As such, outer ledges 149 are radially extended, and are unable to pass through an opening 157 defined by the cup 156. Therefore, the flight portion 110 remains connected to the ground portion 112.

Figure 7:
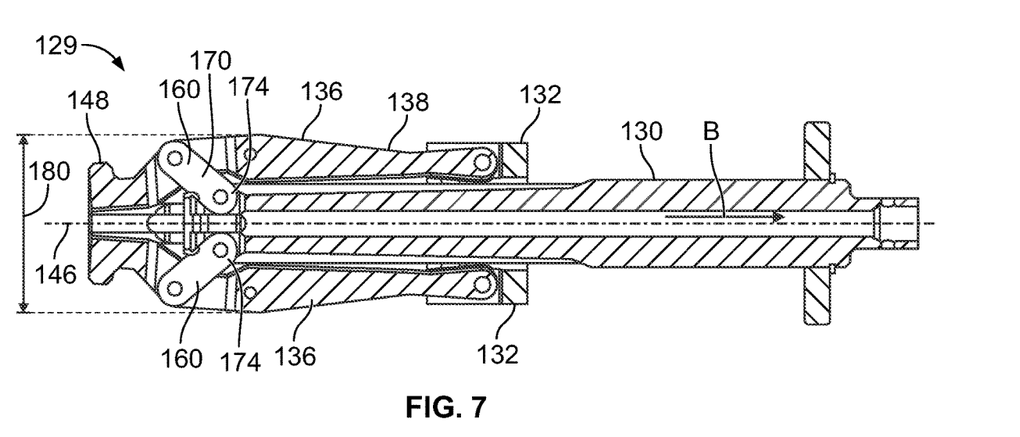
FIG. 7 illustrates a cross-sectional view of the active decoupler in a retracted position through line 6-6 of FIG. 6.

FIG. 7 illustrates a cross-sectional view of the active decoupler 129 in a retracted position through line 6-6 of FIG. 6. Referring to FIGS. 3-6, during a launch operation, an uncoupling signal is output to activate a motor 190 that causes a roller 192 within the ground portion 112 to rotate counterclockwise in the direction of arc A. As the roller 192 rotates in such direction, a linkage 194 biased against the roller 192 pivots downwardly about a coupling 196 away from a linear orientation. In response, a spring 198 within the flight portion 110 urges the pin 130 in the direction of arrow B. As the pin 130 moves toward the ground portion 112 in the direction of arrow B due to the spring force of the spring 198, the pin 130 pulls the pin ends 174 of the levers 160 toward the cuff 132. In response, the levers 160 move away from a perpendicular alignment with the longitudinal axis 146 into an angled alignment. The levers 160 pull the fingers 136 toward one another to reduce the outer envelope 180 of the active decoupler 129. In particular, the levers 160 pull the fingers 136 inwardly, thereby collapsing the fingers 136 toward one another. During such motion, the securing ends 148 of the fingers 136 collapse toward one another and are able to pass through the opening 157 of the cup 156, and are therefore able to pass therethrough. Accordingly, the flight portion 110 is able to effectively and easily separate from the ground portion 112, with the active decoupler 129 remaining with the ground portion 112.

As described, the active decoupler 129 is configured to move between the engaged position in which the levers 160 outwardly brace the fingers 136 (for example, outwardly extend the fingers 136 into radially expanded positions), and a retracted position in which the levers 160 inwardly pull the plurality of fingers 136 (for example, inwardly collapse the fingers 136 into collapsed positions).

Figure 8:
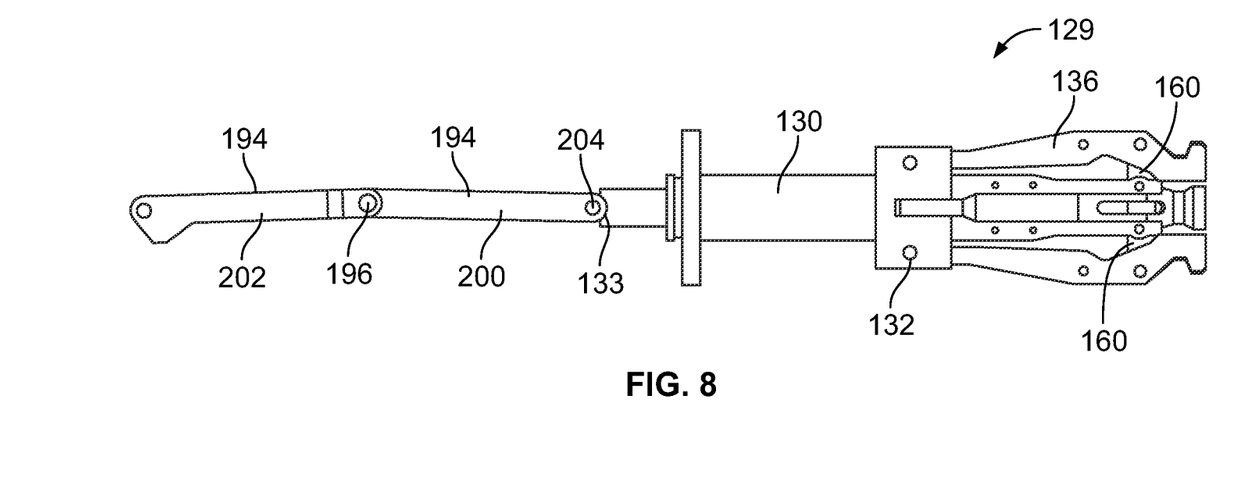
FIG. 8 illustrates a lateral view of the active decoupler in the engaged position coupled to a linkage, according to an example of the subject disclosure.

FIG. 8 illustrates a lateral view of the active decoupler 129 in the engaged position coupled to the linkage 194, according to an example of the subject disclosure. The linkage 194 includes a first arm 200 pivotally coupled to a second arm 202 through the coupling 196. The first arm 200 can also be pivotally coupled to an end 133 of the pin 130 through a coupling 204.

Referring to FIGS. 3 and 8, in the engaged position, in which the fingers 136 are radially expanded so as not to be able to release from the cup 156, the linkage 194 is linearly aligned, such that that the first arm 200 and the second arm 202 are linearly aligned. The roller 192 is biased against the linkage 194 to maintain the linear alignment of the linkage 194. The linearly-aligned first arm 200 and the second arm 202 provide a brace that compresses the spring 198, and ensures that the pin 130 remains disposed between the fingers 136 so that the levers 160 are outwardly and radially extended between the pin 130 and the fingers 136.

Figure 9:
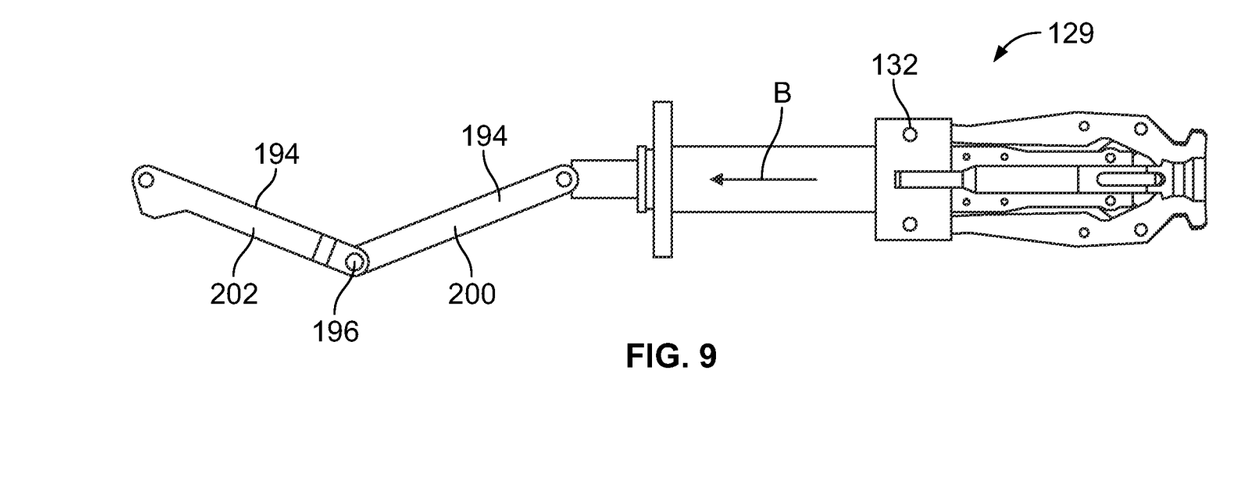
FIG. 9 illustrates a lateral view of the active decoupler in the retracted position coupled to the linkage, according to an example of the subject disclosure.

FIG. 9 illustrates a lateral view of the active decoupler 129 in the retracted position coupled to the linkage 194, according to an example of the subject disclosure. Referring to FIGS. 3 and 9, as the roller 192 rotates in the direction of arc A, the first arm 200 and the second arm 202 are forward into a downward angled orientation (that is, angularly aligned) due to the spring 198 forcing the pin 130 toward the ground portion 112 in the direction of arrow B. As such, the fingers 136 radially collapse toward one another, and are able to release from the cup 156.

Figure 10:
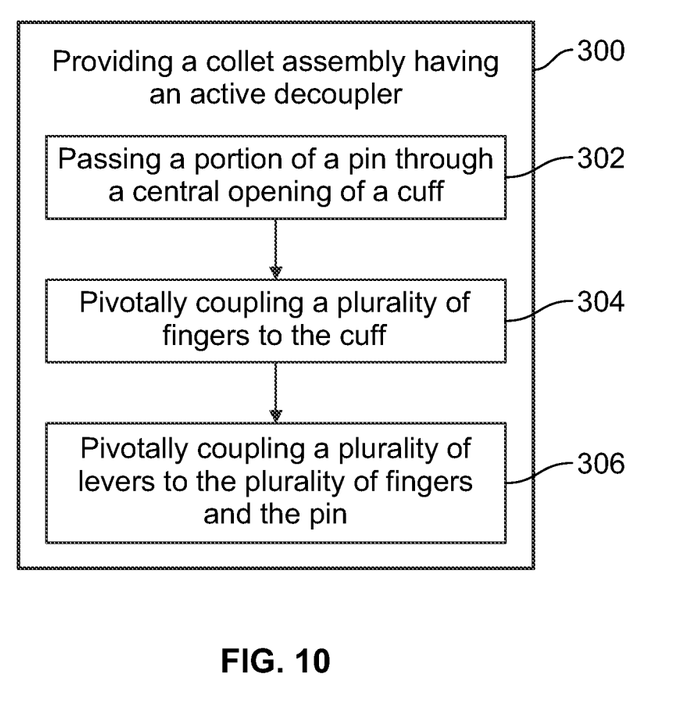
FIG. 10 illustrates a flow chart of a method for connecting a vehicle to a ground station prior to a launch of the vehicle, according to an example of the subject disclosure.

FIG. 10 illustrates a flow chart of a method for connecting a vehicle to a ground station prior to a launch of the vehicle, according to an example of the subject disclosure. Referring to FIGS. 1-10, the method includes providing, ay 300, the collet assembly 108 having the active decoupler 129. Said providing, at 300, includes passing, at 302, a portion of the pin 130 through the central opening 134 of the cuff 132; pivotally coupling, at 304, the plurality of fingers 136 to the cuff 132; and pivotally coupling, at 306, the plurality of levers 160 to the plurality of fingers 136 and the pin 130.

In at least one example, said pivotally coupling the plurality of levers 160 to the plurality of fingers 136 and the pin 130 includes pivotally coupling each of the plurality of levers 160 to a respective one of the plurality of fingers 136.

In at least one example, wherein said providing, at 300, further includes coupling a flight portion 110 to a ground portion 112. The flight portion 110 is configured to separate from the ground portion 112 as the vehicle 100 is launched.

In at least one example, the method also includes disposing the active decoupler 129 within an extension arm 114 of the ground portion 112.

In at least one example, the method also includes fixing the cuff 132 within the ground portion 112.

In at least one example, the method also includes moving the active decoupler 129 between an engaged position in which the plurality of levers 160 outwardly brace the plurality of fingers 136, and a retracted position in which the plurality of levers 160 inwardly pull the plurality of fingers 136. As a further example, the plurality of levers 160 in the engaged position are substantially perpendicular to the longitudinal axis of 146 the collet assembly 108.

In at least one embodiment, the method also includes coupling the spring 198 to the pin 130; coupling the linkage 194 to the pin 130; and operatively coupling the roller 192 to the linkage 194. The roller 192 is configured to be moved between a first position in which the linkage 194 is linearly aligned and a second position in which the linkage 194 is angularly aligned.

Referring to FIGS. 1-10, the collet assembly 108 includes the active decoupler 129, which creates a mechanical advantage required to reduce a likelihood of off-nominal separation. In contrast, prior known collet mechanisms employed passive separation, which can be susceptible to frictional forces, and off-nominal separation. Existing collet mechanisms can be retrofit with the active decoupler 129. For example, the active decoupler 129 can be sized and shaped to replace existing fingers within known collet mechanisms. The active decoupler 129 described herein significantly reduces the risk associated with off-nominal separation.

Further, the disclosure comprises embodiments according to the following clauses:

Clause 1. A collet assembly for an umbilical plate that connects a vehicle to a ground station prior to a launch of the vehicle, the collet assembly comprising an active decoupler comprising:
a pin;
a cuff having a central opening, wherein the pin passes through the central opening;
a plurality of fingers pivotally coupled to the cuff; and
a plurality of levers pivotally coupled to the plurality of fingers and the pin.

Clause 2. The collet assembly of Clause 1, wherein each of the plurality of levers is pivotally coupled to a respective one of the plurality of fingers.

Clause 3. The collet assembly of Clauses 1 or 2, further comprising a flight portion coupled to a ground portion, wherein the flight portion is configured to separate from the ground portion as the vehicle is launched.

Clause 4. The collet assembly of Clause 3, wherein the active decoupler is disposed within an extension arm of the ground portion.

Clause 5. The collet assembly of Clauses 3 or 4, wherein the cuff is fixed within the ground portion.

Clause 6. The collet assembly of any of Clauses 1-5, wherein the active decoupler is configured to move between an engaged position in which the plurality of levers outwardly brace the plurality of fingers, and a retracted position in which the plurality of levers inwardly pull the plurality of fingers.

Clause 7. The collet assembly of Clause 6, wherein the plurality of levers in the engaged position are substantially perpendicular to a longitudinal axis of the collet assembly.

Clause 8. The collet assembly of any of Clauses 1-7, further comprising:
a spring coupled to the pin;
a linkage coupled to the pin; and
a roller operatively coupled to the linkage, wherein the roller is configured to be moved between a first position in which the linkage is linearly aligned and a second position in which the linkage is angularly aligned.

Clause 9. A method for connecting a vehicle to a ground station prior to a launch of the vehicle, the method comprising providing a collet assembly having an active decoupler, wherein said providing comprises:
passing a portion of a pin through a central opening of a cuff;
pivotally coupling a plurality of fingers to the cuff; and
pivotally coupling a plurality of levers to the plurality of fingers and the pin.

Clause 10. The method of Clause 9, wherein said pivotally coupling the plurality of levers to the plurality of fingers and the pin comprises pivotally coupling each of the plurality of levers to a respective one of the plurality of fingers.

Clause 11. The method of Clauses 9 or 10, wherein said providing further comprises coupling a flight portion to a ground portion, wherein the flight portion is configured to separate from the ground portion as the vehicle is launched.

Clause 12. The method of Clause 11, further comprising disposing the active decoupler within an extension arm of the ground portion.

Clause 13. The method of Clauses 11 or 12, further comprising fixing the cuff within the ground portion.

Clause 14. The method of any of Clauses 9-13, further comprising moving the active decoupler between an engaged position in which the plurality of levers outwardly brace the plurality of fingers, and a retracted position in which the plurality of levers inwardly pull the plurality of fingers.

Clause 15. The method of Clause 14, wherein the plurality of levers in the engaged position are substantially perpendicular to a longitudinal axis of the collet assembly.

Clause 16. The method of any of Clauses 9-15, further comprising:
coupling a spring to the pin;
coupling a linkage to the pin; and
operatively coupling a roller operatively to the linkage, wherein the roller is configured to be moved between a first position in which the linkage is linearly aligned and a second position in which the linkage is angularly aligned.

Clause 17. A system comprising:
a vehicle;
a ground station; and
an umbilical plate connecting the vehicle to the ground station prior to a launch of the vehicle, the umbilical plate comprising a collet assembly having an active decoupler, the active decoupler comprising:
a pin;
a cuff having a central opening, wherein the pin passes through the central opening;
a plurality of fingers pivotally coupled to the cuff; and
a plurality of levers pivotally coupled to the plurality of fingers and the pin.

Clause 18. The system of Clause 17, wherein the collet assembly further comprises a flight portion coupled to a ground portion, wherein the flight portion is configured to separate from the ground portion as the vehicle is launched.

Clause 19. The system of Clause 18, wherein the active decoupler is configured to move between an engaged position in which the plurality of levers outwardly brace the plurality of fingers, and a retracted position in which the plurality of levers inwardly pull the plurality of fingers.

Clause 20. The system of Clauses 18 or 19, wherein the collet assembly further comprises:
a spring coupled to the pin;
a linkage coupled to the pin; and
a roller operatively coupled to the linkage, wherein the roller is configured to be moved between a first position in which the linkage is linearly aligned and a second position in which the linkage is angularly aligned.

As described herein, example of the subject disclosure provide a system and a method for ensuring separation of a flight portion from a ground portion as a launch vehicle is launched. Further, examples of the subject disclosure provide an improved collet mechanism that ensures proper separation during launch.

While various spatial and directional terms, such as top, bottom, lower, mid, lateral, horizontal, vertical, front and the like can be used to describe embodiments of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A collet assembly for an umbilical plate that connects a vehicle to a ground station prior to a launch of the vehicle, the collet assembly comprising an active decoupler comprising:
    a pin;
    a cuff having a central opening, wherein the pin passes through the central opening;
    a plurality of fingers pivotally coupled to the cuff, wherein each of the plurality of fingers includes an extension beam having a cuff end, an intermediate portion, and a securing end opposite from the cuff end, and wherein the cuff end is pivotally coupled to the cuff through a first pinned coupling; and
    a plurality of levers pivotally coupled to the plurality of fingers and the pin, wherein each of the plurality of levers includes a beam having a finger end and a pin end, wherein the finger end pivotally couples to a respective one of the plurality of fingers through a second pinned coupling, and wherein the pin end pivotally couples to the pin through a third pinned coupling.

2. The collet assembly of claim 1, further comprising a flight portion coupled to a ground portion, wherein the flight portion is configured to separate from the ground portion as the vehicle is launched.

3. The collet assembly of claim 2, wherein the active decoupler is disposed within an extension arm of the ground portion.

4. The collet assembly of claim 2, wherein the cuff is fixed within the ground portion.

5. The collet assembly of claim 1, wherein the active decoupler is configured to move between an engaged position in which the plurality of levers outwardly brace the plurality of fingers, and a retracted position in which the plurality of levers inwardly pull the plurality of fingers.

6. The collet assembly of claim 5, wherein the plurality of levers in the engaged position are substantially perpendicular to a longitudinal axis of the collet assembly.

7. The collet assembly of claim 1, further comprising:
    a spring coupled to the pin;
    a linkage coupled to the pin; and
    a roller operatively coupled to the linkage, wherein the roller is configured to be moved between a first position in which the linkage is linearly aligned and a second position in which the linkage is angularly aligned.

8. A method for connecting a vehicle to a ground station prior to a launch of the vehicle, the method comprising providing a collet assembly having an active decoupler, wherein said providing comprises:
    passing a portion of a pin through a central opening of a cuff;
    pivotally coupling a plurality of fingers to the cuff, wherein each of the plurality of fingers includes an extension beam having a cuff end, an intermediate portion, and a securing end opposite from the cuff end, and wherein the cuff end is pivotally coupled to the cuff through a first pinned coupling; and
    pivotally coupling a plurality of levers to the plurality of fingers and the pin, wherein each of the plurality of levers includes a beam having a finger end and a pin end, wherein the finger end pivotally couples to a respective one of the plurality of fingers through a second pinned coupling, and wherein the pin end pivotally couples to the pin through a third pinned coupling.

9. The method of claim 8, wherein said providing further comprises coupling a flight portion to a ground portion, wherein the flight portion is configured to separate from the ground portion as the vehicle is launched.

10. The method of claim 9, further comprising disposing the active decoupler within an extension arm of the ground portion.

11. The method of claim 9, further comprising fixing the cuff within the ground portion.

12. The method of claim 8, further comprising moving the active decoupler between an engaged position in which the plurality of levers outwardly brace the plurality of fingers, and a retracted position in which the plurality of levers inwardly pull the plurality of fingers.

13. The method of claim 12, wherein the plurality of levers in the engaged position are substantially perpendicular to a longitudinal axis of the collet assembly.

14. The method of claim 8, further comprising:
coupling a spring to the pin;
coupling a linkage to the pin; and
operatively coupling a roller operatively to the linkage, wherein the roller is configured to be moved between a first position in which the linkage is linearly aligned and a second position in which the linkage is angularly aligned.

15. A system comprising:
a vehicle;
a ground station; and
an umbilical plate connecting the vehicle to the ground station prior to a launch of the vehicle, the umbilical plate comprising a collet assembly having an active decoupler, the active decoupler comprising:
a pin;
a cuff having a central opening, wherein the pin passes through the central opening;
a plurality of fingers pivotally coupled to the cuff, wherein each of the plurality of fingers includes an extension beam having a cuff end, an intermediate portion, and a securing end opposite from the cuff end, and wherein the cuff end is pivotally coupled to the cuff through a first pinned coupling; and
a plurality of levers pivotally coupled to the plurality of fingers and the pin, wherein each of the plurality of levers includes a beam having a finger end and a pin end, wherein the finger end pivotally couples to a respective one of the plurality of fingers through a second pinned coupling, and wherein the pin end pivotally couples to the pin through a third pinned coupling.

16. The system of claim 15, wherein the collet assembly further comprises a flight portion coupled to a ground portion, wherein the flight portion is configured to separate from the ground portion as the vehicle is launched.

17. The system of claim 16, wherein the active decoupler is configured to move between an engaged position in which the plurality of levers outwardly brace the plurality of fingers, and a retracted position in which the plurality of levers inwardly pull the plurality of fingers.

18. The system of claim 16, wherein the collet assembly further comprises:
a spring coupled to the pin;
a linkage coupled to the pin; and
a roller operatively coupled to the linkage, wherein the roller is configured to be moved between a first position in which the linkage is linearly aligned and a second position in which the linkage is angularly aligned.

19. The collet assembly of claim 1, wherein the intermediate portion outwardly bows away from a central longitudinal axis of the collet assembly.

20. The method of claim 8, wherein the intermediate portion outwardly bows away from a central longitudinal axis of the collet assembly.

* * * * *